United States Patent [19]

Armijo et al.

[11] Patent Number: 5,383,228
[45] Date of Patent: Jan. 17, 1995

[54] METHOD FOR MAKING FUEL CLADDING HAVING ZIRCONIUM BARRIER LAYERS AND INNER LINERS

[75] Inventors: Joseph S. Armijo, Saratoga; Herman S. Rosenbaum, Fremont, both of Calif.; Cedric D. Williams, Wilmington, N.C.

[73] Assignee: General Electric Company, San Jose, Calif.

[21] Appl. No.: 91,672

[22] Filed: Jul. 14, 1993

[51] Int. Cl.⁶ ................................................ G21C 3/00

[52] U.S. Cl. ................................... 376/409; 376/416; 376/417

[58] Field of Search ................. 376/409, 416, 412, 417

[56] References Cited

U.S. PATENT DOCUMENTS

| | | | |
|---|---|---|---|
| 2,849,387 | 8/1958 | Brugmann | 204/193.2 |
| 2,873,238 | 2/1959 | Ohlinger et al. | 204/154.2 |
| 3,018,238 | 1/1962 | Layer et al. | 204/154.2 |
| 3,085,059 | 4/1963 | Burnham | 204/193.2 |
| 3,088,893 | 5/1963 | Spalaris | 204/154.2 |
| 3,108,936 | 10/1963 | Gale | 204/154.2 |
| 3,212,988 | 10/1965 | Ringot | 176/67 |
| 3,230,150 | 1/1966 | Martin et al. | 176/68 |
| 3,354,043 | 1/1967 | Boettcher | 176/72 |
| 3,442,761 | 5/1969 | Feraday | 176/67 |
| 3,502,549 | 3/1979 | Charveriat | 176/67 |
| 3,620,691 | 11/1971 | Rubel | 176/88 |
| 3,689,324 | 9/1972 | Wiener et al. | 148/11.5 |
| 3,925,151 | 12/1975 | Klepter | 176/68 |
| 3,969,186 | 7/1976 | Thompson | 176/68 |
| 4,022,662 | 5/1977 | Gordon et al. | 176/68 |
| 4,029,545 | 6/1977 | Gordon et al. | 176/68 |
| 4,045,288 | 8/1977 | Armijo | 176/82 |
| 4,200,492 | 4/1980 | Armijo et al. | 176/82 |
| 4,372,817 | 2/1983 | Armijo et al. | 576/417 |
| 4,445,942 | 5/1984 | Cheng et al. | 376/416 |
| 4,576,654 | 3/1986 | Eddens et al. | 148/11.5 F |
| 4,659,540 | 4/1987 | Cheng et al. | 376/417 |
| 4,718,949 | 1/1988 | Takase et al. | 148/11.5 F |
| 4,876,064 | 10/1989 | Taylor | 420/422 |
| 4,986,957 | 1/1991 | Taylor | 376/417 |
| 5,073,336 | 12/1991 | Taylor | 376/417 |
| 5,190,721 | 3/1993 | Cheng | 376/417 |

FOREIGN PATENT DOCUMENTS

| | | |
|---|---|---|
| 2951102 | 6/1980 | Germany . |
| 47-14200 | 4/1972 | Japan . |
| 47-46559 | 11/1972 | Japan . |
| 1529664 | 10/1978 | United Kingdom . |
| 92/08818 | 5/1992 | WIPO . |

OTHER PUBLICATIONS

"Design and Fabrication of Fuel Rods Clad with Stainless Steel Lined Zircaloy-2," Baroch, General Electric, Feb. 1964.

"Electroplating on Zircaloy-2 with Copper," Caretta et al., Energy Nucleare, vol. 11/No. 9, Sep. 1964.

"Stability and Compatibility of Hydrogen Barriers Applied to Zirconium Alloys," Brossa et al. Euratom, Jan. 1969.

"Electroplating on Zirconium and Zirconium Tin," Schickner et al., Batelle Memorial Institute, Jul. 1952.

"Reactor Development Program Progress Report," Argonne National Lab., Aug. 1973.

U.S. Pat. application Ser. No. 08/011,559, filed Feb. 1, 1993, entitled "Composite Nuclear Fuel Container and Method for Producing Same"; inventors: Rosenbaum, Adamson & Cheng.

U.S. Patent application Ser. No. 06/374,165, filed May 3, 1982; entitled "Buried Zirconium Layer"; inventor: Armijo.

U.S. Pat. application Ser. No. 07/894,887, filed Jun. 8, 1992, entitled "Method for Producing Heat Treated Composite Nuclear Fuel Containers"; inventor: Rosenbaum.

Primary Examiner—Donald P. Walsh
Assistant Examiner—Frederick H. Voss
Attorney, Agent, or Firm—J. E. McGinness; Jeffrey K. Weaver

[57] ABSTRACT

The present invention provides a cladding having an outer circumferential substrate, a zirconium barrier layer metallurgically bonded to the inside surface of the substrate and an inner circumferential liner metallurgically bonded to the zirconium barrier. The inner circumferential liner is more ductile than conventional Zircaloy. The low ductility of the inner circumferential liner is obtained by using a zirconium alloy containing a low tin content (e.g. less than 1.2% by weight) and/or a low oxygen content (e.g. less than 1000 ppm). The inner circumferential liner is less than about 25 micrometers thick.

54 Claims, 2 Drawing Sheets

| PROCESS STEP | PROCESS 1 | PROCESS 2 | PROCESS 3 | PROCESS 4 |
|---|---|---|---|---|
| SUBSTRATE | | | | |
| Beta-Quench Billet | X | X | X | X |
| Billet Machine | X | X | X | X |
| Extrusion | -- | -- | X | X |
| BARRIER LAYER | | | | |
| Machine Billet | X | X | X | X |
| Extrude | X | X | X | X |
| Machine Insert | X | X | X | X |
| INNER LINER | | | | |
| Quench Billet | X | X | X | X |
| Machine Insert | X | X | X | X |
| ASSEMBLE/ WELD TRIPLEX BILLET | | | | |
| Hot Isostatic Pressing | -- | X | X | X |
| Extrusion | X | X | -- | X |
| Induction Anneal | X | X | X | X |
| Tube Reduction | X | X | X | X |
| Vacuum Anneal | X | X | X | X |
| TUBE SHELL | | | | |
| 1st Pass Cold Work Anneal | 69%/593°C | 69%/593°C | 69%/593°C | 69%/593°C |
| Heat Treatment | 927°C outer | 927°C outer | 927°C outer | 927°C outer |
| 2nd Pass Cold Work Anneal | 74%/593°C | 74%/593°C | 74%/593°C | 74%/593°C |
| 3rd Pass Cold Work Anneal | 78%/577°C | 78%/593°C | 78%/593°C | 45%/593°C |
| 4th Pass Cold Work Anneal | -- | -- | -- | 45%/577°C |

*FIGURE 3*

METHOD FOR MAKING FUEL CLADDING HAVING ZIRCONIUM BARRIER LAYERS AND INNER LINERS

This invention relates to methods of fabricating cladding for use in nuclear fuel elements. More particularly, the invention relates to methods of fabricating cladding having a substrate, a zirconium barrier metallurgically bonded to the interior surface of the substrate, and an inner layer metallurgically bonded to the interior surface of the zirconium barrier, the inner layer protecting the barrier from corrosion and having improved resistance to crack initiation and propagation.

BACKGROUND OF THE INVENTION

Nuclear reactors have their fuel contained in sealed cladding for the isolation of the nuclear fuel from the moderator/coolant system. The term cladding, as used herein, refers to a zirconium based alloy tube. Often the cladding will be composed of various layers including a zirconium alloy substrate and an unalloyed zirconium barrier.

The cladding—nominally in the order of 0.030 inches thick—is formed in the shape of a tube with the nuclear fuel contained typically in pellet form therein. These pellets are stacked in contact with one another for almost the entire length of each cladding tube, which cladding tube is in the order of 160 inches in length. Typically, the cladding tube is provided with springs for maintaining the axial position of the fuel pellets and so-called "getters" for absorbing fission gases. Thereafter, the internal portions of the fuel rod are pressurized with helium to help conduct the heat from the fuel material to the cladding.

Zirconium and its alloys, under normal circumstances, are excellent for nuclear fuel cladding since they have low neutron absorption cross sections and, at temperatures below about 350° C., are strong, ductile, extremely stable and relatively nonreactive in the presence of demineralized water or steam. "Zircaloys" are a family of corrosion-resistant zirconium alloy cladding materials. They are composed of 98–99% by weight zirconium, with the balance being tin, iron, chromium, and nickel. "Zircaloy-2" and "Zircaloy-4" are two widely-used zirconium-based alloys for cladding. Zircaloy-2 has on a weight basis about 1.2 to 1.7 percent tin; 0.12 percent iron; 0.09 percent chromium and 0.05 percent nickel. Zircaloy-4 has essentially no nickel and about 0.2% iron but is otherwise substantially similar to Zircaloy-2.

Splitting of Zircaloy cladding may occur due to the interactions between the nuclear fuel, the cladding, and the fission products produced during the nuclear reaction. It has been found that this undesirable performance is due to localized mechanical stresses on the fuel cladding resulting from differential expansion and friction between the fuel and the cladding. These localized stresses and strain in the presence of specific fission products, such as iodine and cadmium, are capable of producing cladding failures by phenomena known as stress corrosion cracking and liquid metal embrittlement.

To combat this problem, some cladding includes barrier layers having low neutron absorption formed on the tubing inner surfaces. Cladding containing barrier layers is sometimes referred to as "composite" cladding. The barrier layer is typically a moderately pure zirconium (such as sponge zirconium) or sometimes highly pure zirconium (such as crystal bar zirconium) sheath metallurgically bonded to the inner surface of the tubing. The pioneering work on barrier layer cladding is described in U.S. Pat. Nos. 4,200,492 and 4,372,817 to Armijo and Coffin, U.S. Pat. No. 4,610,842 to Vannesjo, and U.S. Pat. No. 4,894,203 to Adamson.

Barrier layers have been found to effectively prevent damage to the cladding due to interaction with the pellet. However, if the cladding wall is compromised in some manner (e.g. perforated or split), and water enters the fuel rod interior, the protection afforded by the barrier layer can be reduced. This is because the steam produced by water within the fuel rod can rapidly oxidize the barrier layer.

The mechanical initiation of a cladding breach can be attributed to various causes. A breach can start when debris such as wires or metallic shavings or particles find their way into reactor water that flows within the fuel bundles between the fuel rods. The debris may lodge at a fuel rod spacer adjacent the cladding wall. As a result, the debris vibrates or frets against the cladding wall under the influence of the passing steam/water mixture. Such vibration continues until the cladding wall is penetrated. Corrosion also can be the source of crack initiation and propagation. Moreover, manufacturing defects can be the points of crack origin. Still further, crack propagation can start on the inside of the fuel rods in the corrosive high pressure environment present during in service reactor life.

To protect the zirconium barrier from oxidation should a cladding breach occur, it has been proposed to use a three layer structure. In addition to the substrate and zirconium barrier, a corrosion resistant inner liner bonded to the fuel side of the barrier is employed. Typically, the inner layer will be made from a Zircaloy. If the cladding is breached and steam forms in the fuel rod interior, the inner liner will protect the barrier from rapid oxidation.

Although this three layer design represents a significant advance, certain problems remain. For example, when exposed to fission products, Zircaloy inner liners sometimes serve as a site for crack initiation and propagation. If a crack in the inner liner becomes sufficiently deep (achieving a "critical length" or "critical depth"), it can propagate through the zirconium barrier and possibly through the entire cladding. It should be noted that the terms "critical length" and "critical depth" used herein refer to cracks in the radial direction of the inner liner wall. Further, it may be difficult to fabricate a three layer structure in which a corrosion resistant inner liner is bonded to a softer zirconium barrier layer. Because the barrier layer is soft, the inner liner is at risk of deforming nonuniformly or perhaps tearing during process steps such as tube reduction. Existing processes therefore may be unsuitable for avoiding such difficulties.

Thus, there exists a need for a fabrication method for preparing cladding having an inner liner which protects the barrier layer from oxidation and at the same time resists crack initiation and propagation at the cladding fuel side.

SUMMARY OF THE INVENTION

The present invention provides a method of preparing a cladding tube having an outer substrate, an intermediate zirconium barrier layer, and an inner liner. The cladding tube is fabricated from a substrate billet, a barrier layer sleeve, and an inner liner sleeve. At some point during the process, these three components are bonded to one another. The properties of the inner liner are particularly important in this invention. Preferably, the inner liner is a zirconium alloy which resists cracking when exposed to the interior environment of a fuel rod. Suitable inner liner alloys are usually softer than structural alloys such as Zircaloy, but may be made from a modified Zircaloy. Preferred alloys for the inner liner will contain relatively low amounts of one or more alloying element—in comparison to structural alloys. Thus, in one preferred embodiment, the inner liner is comprised of a modified Zircaloy having less than about 1.2% tin by weight. In another preferred embodiment, the inner liner will be a zirconium alloy having a relatively low oxygen content—e.g. less than about 1000 ppm oxygen. In addition, the inner liner layer should be thin enough that cracks in the liner cannot grow larger than the critical depth required to propagate a crack through the zirconium barrier. Thus, in preferred embodiments, the inner liner will be no thicker than about 30 micrometers, and more preferably no thicker than about 20 micrometers.

During fabrication processes according to this invention, the dimensions of the various components are carefully controlled. In many embodiments, the substrate, the barrier layer, and the inner liner are bonded to one another by extrusion. However, in some preferred methods of this invention, these components are bonded by hot isostatic pressing or another technique which provides dimensional stability that may not be available with extrusion. In these embodiments, the bonding step may be conducted before or after the extrusion step.

The present invention provides other methods to ensure that the dimensional stability of the tubing and each of its components is maintained during fabrication. In some embodiments, for example, four or more cold work passes may be employed in place of the three passes used in conventional fabrication processes. This means that the tube is reduced by a lesser amount in at least some of the cold work passes, thus reducing the risk that the barrier layer and/or liner will be subject to non-uniform damaging deformation. In a specific embodiment, a tubeshell is subjected to four cold work passes, the first two of which are conducted to between about 60 and 80%, and the last two of which are conducted to between about 40 and 50%.

In other preferred embodiments, extra surface conditioning is employed to ensure that the dimensions of the three cladding tube components are maintained within tight tolerances and to ensure that the surface roughness is minimized. Preferably, the bonding surfaces of the components (the substrate interior surface, the zirconium barrier layer interior and exterior surfaces, and the inner liner exterior surface) have a surface roughness of no more than about 64 microinches, and more preferably, no more than about 32 microinches. Surface conditioning processes used may include honing, grinding, sanding, buffing, chemical etching, and chemical mechanical polishing.

A further understanding of the invention may be obtained by reference to the drawings and description of specific embodiments which follow.

BRIEF DESCRIPTION OF THE DRAWINGS

FIG. 3 is a table comparing four processes according to the present invention.

DESCRIPTION OF THE SPECIFIC EMBODIMENTS

I. General

As used herein, the phrase "alpha crystalline structure" or "alpha phase" means the close-packed hexagonal crystal lattice structure of zirconium and zirconium-containing alloys that is stable at lower temperatures. The temperature range in which the alpha phase is stable is referred to as the alpha range. For Zircaloy-2, the pure alpha phase exists at temperatures lower than about 820° C.

As used herein, the term "beta crystalline structure" or "beta phase" means the body-centered cubic crystal lattice structure of zirconium and zirconium-containing alloys that is stable at higher temperatures. The temperature range in which the beta phase is stable is referred to as the beta range. For Zircaloy-2, the pure beta phase exists at temperatures above about 960° C.

Figure 1:
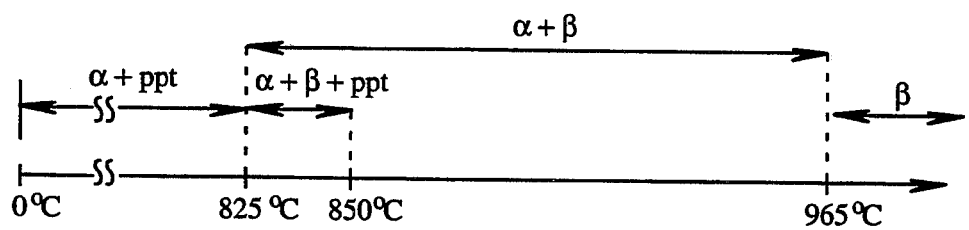
FIG. 1 is a phase chart for a typical zirconium containing alloy.

As used herein, the term "alpha plus beta crystalline structures" or "alpha plus beta phases" refers to mixtures of the alpha and beta phases that exists at some temperatures in some zirconium alloys—but not pure zirconium. In pure zirconium, the alpha crystalline structure is stable up to about 860° C. At about this temperature a phase change occurs to form a beta crystalline structure which is stable at temperatures above about 860° C. Zirconium alloys, in contrast, have a range of temperatures over which the alpha to beta phase change occurs. In this range, a mixture of alpha and beta crystalline structure is stable. The specific temperature range in which the mixture is stable depends on the specific alloy. Zircaloy-2, for example, exhibits a stable mixture of alpha plus beta crystalline structures from about 825° C. to about 965° C. Below about 850° C., intermetallic precipitates form. FIG. 1 shows the various phase regions for Zircaloy-2.

As used herein, the term "section" refers to a piece of metal having various uses and shapes. The term "tubing" refers to a metal tube having various uses, and the term "fuel rod container" or simply "container" refers to tubing used in fuel rods to enclose fuel pellets. Sometimes the fuel rod container is referred to as "cladding" in the art.

Figure 2:
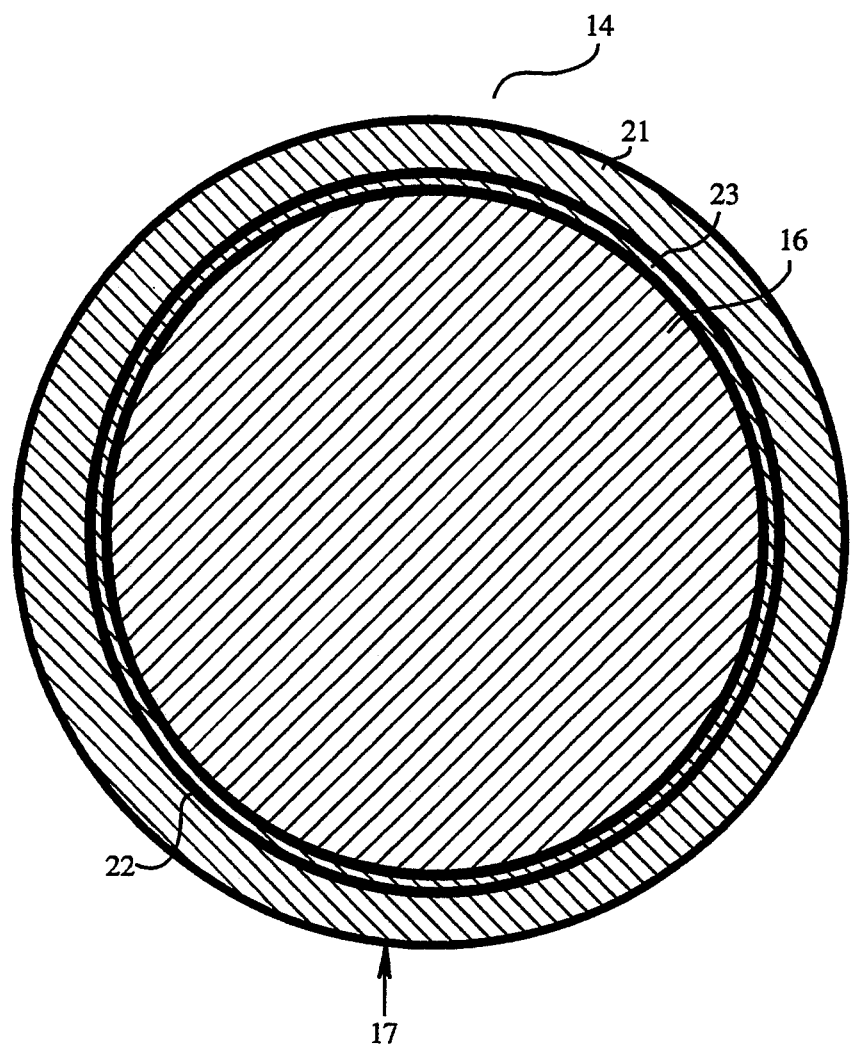
FIG. 2 is a cross sectional view of a nuclear fuel element of this invention having a substrate, a barrier layer, and an inner liner.

Referring to FIG. 2, a fuel element 14 (commonly referred to as a fuel rod) prepared according to the present invention is shown. Fuel element 14 includes a fuel material core 16 and a surrounding container 17. The fuel element 14 is designed to provide excellent thermal contact between the fuel rod container 17 and the fuel material core 16, a minimum of parasitic neutron absorption, and resistance to bowing and vibration which is occasionally caused by flow of coolant at high velocity. The fuel material core is typically composed of a plurality of fuel pellets of fissionable and/or fertile material. The fuel core may have various shapes, such as cylindrical pellets, spheres, or small particles. Various nuclear fuels may be used, including uranium compounds, thorium compounds and mixtures thereof. A preferred fuel is uranium dioxide or a mixture comprising uranium dioxide and plutonium dioxide.

The container 17 is a composite cladding having a structure including a substrate 21, a zirconium barrier 22, and an inner layer or liner 23. The substrate forms the outer circumferential region of a cladding tube, the inner layer forms an inner circumferential region of the cladding tube, and the zirconium barrier is located therebetween.

The substrate may be made from a conventional cladding material such as a stainless steel or zirconium alloy. Suitable zirconium alloys for the substrate preferably include at least about 98% zirconium, up to about 0.25% iron, up to about 0.1% nickel, and up to about 1.7% tin (all percents by weight). Other alloying elements may include niobium, bismuth, molybdenum, as well as various other elements used in the art. Most generally, any zirconium alloy with suitable corrosive resistance to BWR water and with sufficient strength and ductility may be employed. In a preferred embodiment of this invention, the substrate is Zircaloy-2 or Zircaloy-4.

In some preferred embodiments, the substrate will have a microstructure (i.e. precipitate size distribution) that resists corrosion and/or crack propagation. It is known that the microstructure of Zircaloys and other alloys can be controlled by the anneal temperature and time as well as other fabrication parameters. It is also known that in boiling water reactors (BWRs), smaller precipitates generally provide superior resistance to corrosion while in pressurized water reactors (PWRs), larger precipitates generally provide superior resistance to corrosion. In either environment, coarse precipitates provide improved resistance to axial crack propagation. In a preferred embodiment, the substrate will have a dense distribution of fine precipitate (e.g., between about 0.01 and 0.15 micrometers in diameter) in the outer circumferential region and a less dense distribution of coarse precipitates (e.g., between about 0.2 and 1 micrometers in diameter) in the interior circumferential region. This embodiment will be especially preferred in BWRs. In PWRs, preferred substrates will have coarse precipitates distributed throughout. Detailed discussions of Zircaloy microstructure and methods of fabricating cladding having a desired microstructure are found in U.S. patent application Ser. No. 08/052,793 entitled ZIRCALOY TUBING HAVING HIGH RESISTANCE TO CRACK PROPAGATION and U.S. patent application Ser. No. 08/052,791 entitled METHOD OF FABRICATING ZIRCALOY TUBING HAVING HIGH RESISTANCE TO CRACK PROPAGATION, both of which were filed on Apr. 23, 1993, assigned to the assignee hereof, name Adamson and Potts as inventors, and are incorporated herein by reference for all purposes.

Metallurgically bonded on the inside surface of substrate 21 is the zirconium barrier 22. The barrier, together with the inner liner, shields the substrate from the nuclear fuel material inside the composite cladding. In preferred embodiments, the thickness of the barrier layer is between about 50 and 130 micrometers (approximately 2.5 mils) and more preferably between about 75 and 115 micrometers (approximately 3.2 to 4.7 mils). Generally, the zirconium barrier layer is made from unalloyed zirconium such as "low oxygen sponge" grade zirconium, "reactor grade sponge" zirconium, and higher purity "crystal bar zirconium". Sponge zirconium is typically prepared by reduction of zirconia with elemental magnesium at elevated temperatures at atmospheric pressure. The reaction takes place in an inert atmosphere such as helium or argon. Crystal bar zirconium is produced from sponge zirconium by converting the zirconium metal in sponge zirconium to zirconium tetraiodide vapor and then decomposing the iodide on an incandescent wire. Crystal bar zirconium is more expensive than sponge zirconium, but has few impurities and has greater resistance to radiation damage.

Metallurgically bonded to the inside surface of the zirconium barrier 22 is the inner liner 23. As shown, the inner liner is the portion of the composite cladding closest to the nuclear fuel material 16. It protects the zirconium barrier from rapid oxidation should the fuel element interior come in contact with steam. Thus, the inner liner should be a relatively corrosion resistant material such as Zircaloy. For purposes of this invention, however, the inner liner should be softer than conventional Zircaloy so that crack initiation and propagation on the inner surface of the cladding tube are minimized.

Although the inner liner should be softer than conventional Zircaloy, it is preferably harder than the zirconium barrier. This permits the tube to be machined, honed, etc. more easily than the softer unalloyed zirconium. Thus, the inner layer of this invention provides the additional benefit of permitting various fabrication steps to be performed more easily than is possible with a naked zirconium barrier.

The inner liner can be formed from a variety of zirconium alloys. Suitable alloys should be resistant to corrosion in steam at 300°–400° C. and relatively soft in comparison to conventional Zircaloys. Many zirconium alloys of specified composition meet these criteria. Generally, alloys containing low concentrations of alloying metals (e.g. Cr, Ni, Nb, Sn) and/or oxygen will be softer. However, care should be taken in reducing the alloying elements to levels that might substantially diminish the corrosion resistance of the alloy. One preferred class of zirconium alloys has a relatively low tin concentration in comparison to corresponding structural alloys (e.g. Zircaloys used in cladding substrates). Preferred low-tin inner liner compositions within this class (such as modified Zircaloys) will have less than about 1.2% tin by weight. More preferably, the alloys will have between about 0.5 to 1.2% tin, and most preferably about 0.8% tin. Other preferred liner alloys include zirconium alloys having low concentrations of iron. For example, a suitable modified Zircaloy-2 contain less than about 0.12 percent iron, and preferably between about 0.02 and 0.1% iron by weight. A modified Zircaloy-4 will contain less than about 0.2% iron, and preferably between about 0.02 and 0.12% iron by weight.

Other preferred zirconium alloys have reduced oxygen concentrations. Zircaloy inner liners of the present invention therefore preferably contain less than about 1000 ppm, more preferably less than about 800 ppm, and most preferably less than about 600 ppm oxygen by weight. Of course, the hardness of other, non-Zircaloy, zirconium alloys also can be reduced by decreasing the oxygen and tin concentrations.

The inner liner should be sufficiently thin that microcracks are prevented from reaching critical depth. If a crack in the inner liner exceeds the critical depth, it could propagate beyond the inner liner and into the barrier and even the substrate. The critical depth varies depending upon the particular alloy from which the inner liner is made. In general, so long as the inner layer can maintain its corrosion resistance, thinner layers are preferred. The critical depth for modified Zircaloy inner liners of this invention is believed to be less than about 30 micrometers, and preferably less than about 20 micrometers. With some fabrication methods, it may be impractical to produce liners thinner than about 10 micrometers. Thus, the inner liner thickness will often be limited to between about 10 and 20 micrometers thick. It should be recognized, however, that thinner layers can be produced with slightly modified fabrication methods such as those employing vapor deposition techniques.

Further structural details of the tubing produced according to the methods herein are described in U.S. patent application Ser. No. 08/092,188 entitled INNER LINERS FOR FUEL CLADDING HAVING ZIRCONIUM BARRIER LAYERS which was filed on Jul. 14, 1993, the same day as the instant application, is assigned to the assignee hereof and is incorporated herein by reference for all purposes.

The methods of this invention have as their goal the formation of tubing having the above properties. Generally the process is started with a Zircaloy or other suitable alloy ingot melt which is forged, pierced, and expanded to produce a thick-walled billet. The billet is quenched from the beta phase at a rate preferably faster than about 5° C. per second. More preferably, the quench rate will be faster than about 50° C. per second. After the beta quench, an extrusion step and possibly some cold working, annealing, and surface conditioning steps designed for dimensional stability are employed. This results in a tubular section referred to as a tubeshell which is subsequently subjected to various annealing, cold working, and other steps to produce the final fuel rod cladding. At some point after the beta quench, the barrier layer and inner liner are bonded to the interior of the substrate (the exterior surface of the inner liner is actually bonded to the interior surface of the barrier layer). Both of these layers are provided as sleeves formed in one or more steps from billets of the appropriate material—zirconium for the barrier layer and a zirconium alloy for the inner liner.

During the entire fabrication sequence, dimensional control of the cladding must be maintained. In the cladding—having a relatively hard zirconium alloy liner bonded to a relatively softer barrier layer—the inner liner can easily become deformed or breached during processing. The resulting cladding may be unable to adequately protect the zirconium barrier layer during the reactor life cycle. In the present invention, one or more steps is employed to maintain adequate dimensional control of the three layers. For example, the layers may be subjected to careful surface treatment before they are bonded to one another. Special surface treatments may also be employed after bonding to maintain dimensional control.

Chemical and mechanical surface conditioning steps are currently employed in cladding fabrication. These include chemical etching, grinding, sanding, buffing, honing, and machining with a lathe. The present invention may employ these and other surface conditioning steps. Chemical mechanical polishing such as now employed in the semiconductor device fabrication industry is an example of another process that may be used in the present invention. In such processes, a slurry of silica or other ceramic particles suspended in water or other suitable liquid medium is used to polish a tube surface. The chemical medium may be either acid or base, but is preferably acidic in this invention. Generally, the step should be chosen such that microroughness and surface defects are minimized. Preferably, the conditioning employed in this invention reduces surface roughness to less than about 64 microinches and more preferably less than about 32 microinches. This should provide a very clean, very smooth, defect-free surface. In many preferred embodiments, a chemical etching step will be employed at or near the end the fabrication to control the thickness of the inner liner.

Various methods may be employed to bond the three components to one another. However, because the extrusion step must be conducted regardless of what technique is employed to bond the components, extrusion is the preferred bonding process. In this approach, the extrusion process itself provides the necessary energy (in the form of compression) to bond the three layers. Extrusion, however, sometimes provides insufficient dimensional control because of the temperature and large reduction in wall thickness during the process. Therefore, some alternative embodiments of the present invention will employ a step of bonding the barrier layer or barrier layer plus the inner liner to the substrate before or after the extrusion step.

One preferred alternative method of bonding the components is hot isostatic pressing. In this process, an assembly of the components to be bonded is placed in a large pressure vessel at very high atmospheric loading so that gas pressure forces the pieces together over an undeformable mandrel to form a metallurgical bond. For a Zircaloy-2 substrate, a zirconium barrier layer, and a modified Zircaloy-2 inner liner, the pressing step is preferably conducted at a temperature of between about 400° C. and 850° C. and at a pressure of between about 13,000 and 40,000 psi. More preferably, the pressing is conducted at a temperature of between about 400° C. and 700° C. and at a pressure of between about 20,000 and 40,000 psi. Depending upon the temperature and pressure employed, the pressure is preferably applied for between about 4 and 20 hours. Suitable apparatus for hot isostatic pressing are available from ASEA (Sweden).

In another method, the barrier and inner liner sleeves are bonded to the billet inner surface by heating (such as at 750° C. for 8 hours) to give diffusion bonding between the tubes and the billet. In yet another method, the components are bonded to the billet by an explosive bonding process in which a charge is detonated within the cladding tube assembly. The force of the explosion drives the components together to form permanent bonds.

In any bonding process—extrusion, hot isostatic pressing, etc.—the substrate billet, barrier layer sleeve, and inner liner sleeve are first joined at their ends by electron beam welding or other conventional process prior to the bonding step. This maintains the desired alignment of the components during the bonding step. In electron beam welding, an electron beam is used to heat the ends of the cylindrical tubes until they fuse to form a composite.

If a method other than extrusion is used to bond the components, the bonding step must be performed before or after extrusion. In one preferred embodiment, the substrate billet is prepared as described above and then extruded without the barrier layer and inner liner sleeves. The extruded substrate billet is then annealed and its interior surface conditioned in preparation for bonding. The zirconium alloy inner liner sleeve and barrier layer sleeve are prepared and conditioned to have a length and diameter corresponding to the length and inner diameter of the substrate. The substrate and sleeves are then assembled and bonded by hot isostatic pressing, heating, etc. Because this embodiment does not include extrusion of the structure, the risk of the inner liner becoming deformed on the barrier layer during extrusion is eliminated. In an alternative embodiment, the barrier layer is bonded to the substrate during the extrusion step and the inner liner is bonded to the barrier layer in a separate post-extrusion step (by e.g. hot isostatic pressing). Of course, the inner liner sleeve must first be worked to a size complementary to the extruded substrate/barrier tube.

The three-layer structure formed by bonding is preferably annealed and reduced to a standard diameter (e.g. about 2.5 inches) by cold work. A post-cold work annealing step and some surface conditioning may also be conducted. The resulting tubing is referred to as a tubeshell.

The tubeshell is subjected to multiple passes of cold working—usually with a pilger mill—to impart the dimensions required for a particular application. After each cold work step, an anneal is conducted for e.g. about two to four hours to relieve stress and regain ductility. Preferably, the cold work passes are each conducted to between about 30 and 80%, although this is not critical to the invention. The percent value of cold work is roughly analogous to the percent reduction of wall thickness during the process. It will be understood by the reader that pilger mills are generally available, albeit fairly complicated, pieces of equipment. During cold working with a pilger mill, a shaped die is rolled on the outside of the tube while a hard tapered mandrel supports the inside of the tube. In this manner, the wall thickness and diameter of the tube are simultaneously reduced.

The anneal temperature and time after cold working will affect the grain structure and the precipitate structure. For 70% cold work on Zircaloy tubing, anneals at temperatures between about 490° C. and 577° C. will relieve stress, and therefore are referred to as stress relief anneals. At higher temperatures (i.e. above about 577° C.), recrystallization will occur. This not only relieves the stress imparted by cold work, but reorients the grains. If a somewhat higher temperature anneal is used (e.g. above about 650° C.), grain growth will occur. These temperatures are not fixed but are a function of the alloy and amount of cold work. More cold work imparts a larger driving force for stress relief, recrystallization, etc. Thus, as more cold work is performed, the temperature of stress relief, recrystallization, etc. decreases.

Modified size reduction steps may be employed to reduce the possibility that the inner liner will be deformed or otherwise damaged during cold working. Thus, for example, the amount of cold work during each tube reduction pass can be reduced to e.g. 30 to 60% from the 60 to 80% employed in conventional processes. This reduces the risk that the liner will be deformed or breached during cold working, but it may require additional passes to attain the desired tube dimensions. Thus, for example, one or more of the standard cold work tube reduction steps sometimes will be divided into two or more separate reduction steps. In one embodiment, a third pass cold work step (conventionally of about 70 to 80%) can be performed as two steps, each of about 40 to 50%.

The risk of damage during cold work steps can also be reduced by substituting a HPTR (high pressure tube reducer) machine for a pilger mill in some of the tube reduction passes. The HPTR machine is sometimes referred to as a Tselikov machine (see U.S. Pat. No. 3,675,840 issued to Tselikov et al., Jul. 4, 1972). It exhibits better dimensional control than a pilger mill but operates more slowly. Generally, a HPTR machine has a smaller overall size and a smaller set of dies than a pilger mill. Further, it typically contains three dies instead of the two dies usually employed in a pilger mill. In preferred alternative embodiments of this invention, the HPTR machine is employed in the later cold work passes (e.g. the second and third passes after the tubeshell stage in a three-pass tube reduction sequence).

To impart additional corrosion resistance to the outer circumferential region of the substrate, a step of selectively heating and rapidly quenching the outer region from the alpha plus beta region or the pure beta region while maintaining the inner region at a lower temperature preferably may be performed during the subsequent tube reduction processing. This creates a metallurgical gradient in which the outer region contains fine precipitates, while the inner region retains coarse precipitates. This heat treatment step can be accomplished by various methods including induction coil heating as described below. It may also be desirable to create or preserve coarse precipitates in the inner region of the tube by performing at least one high temperature anneal and/or performing the recrystallization anneals at relatively high temperatures. As used herein, a high temperature anneal refers to a process conducted at between about 650° and 750° C. for between about 1 and 100 hours. A coarse precipitate microstructure generally resists crack propagation. A more detailed discussion of the procedure employed to produce this microstructure is provided in U.S. patent application Ser. No. 08/052,791, previously incorporated by reference.

For ease in understanding some processes of this invention, four exemplary processes will be described. It is to be understood that the described embodiments of this invention are not intended to be limiting, as various alternative processes will produce the desired structure. For example, it will be recognized by those of skill in the art that the temperatures and times of the heat treatments and anneals may be varied somewhat from the recited values. In addition, various alloys may be used in place of the Zircaloy-2 and zirconium employed in the described structure. When other alloys are used, the process conditions may be different form those recited below.

II. Exemplary Processes

The four processes described below will be referred to throughout as "process 1," "process 2," "process 3," and "process 4." A tabular summary of the steps employed in the individual processes is provided for convenient comparison in FIG. 3.

Process 1

The process begins with a cylindrical billet of about 7 to 10 inches in diameter and about two feet in length. By the end of the processes described herein, the billet is converted to about 750 feet of tubing having about a one-half inch outer diameter. The billet is formed from a Zircaloy-2 ingot melt which is forged at a temperature of from about 1020° to 1120° C. for between about 20 minutes to six hours. The resulting billet is then pierced and expanded by driving a mandrel through the billet to form a hole along the billet's axis.

A rapid beta quench is done on the billet. The rate of the beta quench depends, in part, on the thickness of the billet; thinner billets are quenched faster. Generally, the beta quench involves heating the entire billet into beta phase, above about 1000° C., and then rapidly cooling from above 1000° C. to about 700° C. by immersion in a tank of water or brine. The inner and outer surfaces of the quenched billet are then ground or machined on a lathe or other suitable machine to remove any surface defects.

The barrier layer and inner liner are provided as sleeves that are bonded to the interior of the Zircaloy substrate billet. To prepare the zirconium barrier layer sleeve, a zirconium ingot is forged (at a temperature slightly lower than that of the substrate billet), extruded, and, if necessary, straightened. To prepare the barrier layer for bonding, it is machined on, for example, a lathe to about 3.5 to 4 inches outer diameter. In addition, it may be reamed, honed, and/or broached to a nominal inner diameter of about 1.5 to 2 inches. Finally, a surface treatment such as chemical etching or mechanical grinding is sometimes employed to reduce the number of defects on the surface. An acid bath including hydrofluoric and/or nitric acid may be employed as a chemical etchant.

The inner liner sleeve is made from, for example, a modified Zircaloy-2 prepared in much the same manner as the barrier layer, but extruded, machined, and surface treated to a smaller size so that it can fit in interior of the substrate (billet) and zirconium barrier layer sleeve. It will be sufficiently thin that after extrusion and other tube reduction steps, its wall is not more than about 25 micrometers thick.

Before bonding, the surface of the substrate, the barrier layer, and the inner liner should be mechanically and/or chemically treated to be free of surface anomalies, oxidation, and staining. Preferably, the surfaces are cleaned, etched, and rinsed in hot deionized water. The surface conditioning should leave bonding surfaces having surface roughnesses of no more than about 64 microinches.

The billet is then assembled by placing the inner liner and the barrier layer within the substrate billet interior. The diametrical clearance between adjacent bonding surfaces are no greater than about 0.015 inches. The billet is then evacuated (to about $10^{-3}$ Torr or less) and a circumferential seal weld is made at the ends of the three components by electron beam welding. The three components are then bonded by extruding the assembly at a tube temperature of about 480° to 675° C. (e.g. about 570° C.) to an outer diameter of about 3 to 3.5 inches. Extrusion is accomplished by putting the tube through a set of tapered dies under high pressure. Suitable extruders are available from Mannessmann Demang, Coreobolis, Pa.

The extruded structure now contains a substrate, a barrier layer, and inner liner bonded to one another. This structure is then annealed at about 650° to 800° C., for example, in a vacuum furnace, an inert gas furnace, or an induction coil. Suitable vacuum annealing furnaces are available from Centorr Vacuum Industries, located in Nashua, N.H. After annealing, the tube size is reduced tube diameter is about 2.5 inches in diameter. This is accomplished by a step of at least about 35% cold work step in a pilger mill. Before further treatment, the outer surface of the tube is conditioned by, for example, grinding, belt polishing, grit blasting, or belt sanding. The inner surface is conditioned by honing or broaching. Next, the tube is given a recrystallization anneal at between about 600° and 700° C. for between about 1.5 to 3 hours. Finally, the inner and outer surfaces are mechanically conditioned and chemically etched as above, but less material is removed. The product produced by the preceding sequence of steps is a tubeshell which is available in specified dimensions from various vendors such as Teledyne Wahchang (Albany, Oreg. USA), Western Zirconium (A Westinghouse company of Ogden, Utah), and Cezus (France).

At this point, the first of three cold-work reductions is performed with a pilger mill. Typically about 65-75% cold work is performed during the first pass. This percent value is roughly analogous to the percent reduction of the wall thickness. If the tube is given any more cold work without stress relief, it may crack during manufacture. To relieve the stress caused by cold working, the tube is given a recrystallization anneal. For Zircaloy-2, this is conducted at between about 577° and 650° C. (e.g. about 593° C.) for two hours in a large vacuum annealing furnace.

Next, the tube is straightened in preparation for heating in an induction furnace. The straightened tube is then heat treated at about 927° C. (in the alpha plus beta crystalline region of Zircaloy-2) on the outer 30% of the wall. This is accomplished by heating the tubeshell with a high-energy or frequency (from an induction coil) which penetrates about 33% of the wall. During the induction heating water flows through the tube center. This serves two purposes: first it maintains the interior of the tube at a lower temperature while the outer region is heated, and second it very rapidly quenches the entire tube when the heating energy is removed. It is important to recognize that the inner portion of the tubeshell is not substantially heated. Further details of the induction heating process are provided in U.S. Pat. No. 4,576,654 to Eddens which is incorporated herein by reference for all purposes.

Regarding the cooling of the tube, any fluid which is generally inert with respect to the inner liner alloy or barrier material can be used. For example, a gas coolant, water, or even steam can be used in such a process.

Next, a second pass cold work is performed (this time to about 70-75%) with a pilger mill. To remove the stress induced by this second pass cold work step, another anneal (again at 593° C. for about 2 hours) is performed. The third pass cold work is performed with a pilger mill as before, but this time to about 70-80%. This reduces the tube to its final size—about one-half inch outer diameter with a nominal wall thickness of roughly 30 mils. This tube is given a final recrystallization anneal, for example, at 577° C. for about two hours. After the final anneal and a chemical etch to control the inner liner thickness, the tube is ready for use in a reactor.

Process 2

A substrate billet, barrier layer sleeve, and inner liner sleeve are prepared as in process 1. However, before coextrusion and after electron beam welding, the components are bonded by a hot isostatic pressing step as described above.

After, the hot isostatic pressing and extrusion steps, the remaining process steps are conducted as described above in process 1. The prebonding step minimizes the chances for the thin inner liner to become deformed and irregular during the extrusion process and thus gives more dimensional control over the final product. This has the advantage of reducing the amount of machining or etching necessary to attain the necessary dimensions.

Process 3

This process is identical to process 2 except that the hot isostatic pressing step is performed after the extrusion step and immediately before the 35% cold work tube reduction step. Thus, the substrate billet (not the barrier layer or inner liner) is independently extruded and tube reduced. The barrier layer and inner liner are separately extruded and then bonded to the substrate over a solid incompressible mandrel. Of course, the barrier layer and inner liner sleeves must be extruded and or machined to dimensions matching those of the extruded substrate.

This process has the advantage of avoiding a step of extruding the structure as such. It is known that extrusion can produce dimensionally nonuniform barrier layers. This nonuniformity could be especially difficult to correct in the case or a structure where a relatively hard inner liner is bound to a relatively soft barrier layer. By bonding the barrier layer and inner liner to the substrate after extrusion, the dimensional uniformity of the inner layers is more likely to be maintained throughout the process.

In an alternative embodiment of this process, the barrier layer is bonded to the substrate during extrusion (as in process 1) or before extrusion by hot isostatic pressing (as in process 2). The inner liner, however, is bonded to the barrier layer only after the extrusion process. Preferably, it is bonded by hot isostatic pressing before the 35% cold work tube reduction step.

Process 4

This process follows the same sequence of steps as process 1 through the tubeshell stage. It should be noted that the tubeshell could also be prepared by processes 2 or 3 or some other suitable process. After the tubeshell has been formed, it is subjected to four cold-work reductions (three post-tubeshell cold work reductions were employed in processes 1-3). The first two tube reduction passes and the heat treatment in the induction furnace are conducted as described in process 1. The third tube reduction pass, however, is divided into two separate tube reduction passes. Both of these passes are conducted at about 45% cold work. A recrystallization anneal follows each of these passes. Generally, the temperature of the recrystallization anneals are nearly the same as those employed in process 1. However, because less cold work has been conducted in each pass of this process, less driving force for recrystallization is provided and slightly higher annealing temperatures may be necessary to get the same degree of recrystallization.

Summary

Each of the above sequences of bonding, extrusion, annealing, cold working and heat treating provides a cladding tube in which the inner liner and zirconium barrier layer form uniform defect-free layers bonded to the substrate. The process conditions are chosen to ensure that the individual layers do not become deformed during processing and that the amount of machining or etching necessary to attain the desired dimensions is minimized.

It will be recognized by those of skill in the art that various steps are performed in addition to those listed in the above processes. For example, various nondestructive tests such as corrosion tests and ultrasonic tests for crack imperfections in the surface are performed. Additional surface conditioning (chemical etching or machining for example) and straightening steps (not described above) are often performed. This is not an exhaustive list, but merely serves to describe some steps which may be employed.

III. Conclusion

Although the foregoing invention has been described in some detail for purposes of clarity of understanding, it will be apparent that certain changes and modifications may be practiced within the scope of the appended claims. For instance, the Zircaloy-2 described above is an example of an alloy that can advantageously be used in the present invention. Some other zirconium-based alloys as well as other metal alloys having similar structures can in many instances also be used in the methods of this invention.

What is claimed is:

1. A method of making a cladding tube having an outer substrate, an intermediate zirconium barrier layer, and an inner liner, the substrate, barrier layer, and inner liner each having interior and exterior circumferential surfaces, the method comprising the following steps:

(a) bonding the zirconium barrier layer exterior circumferential surface to the substrate interior circumferential surface; and (b) bonding the inner liner outer circumferential surface to the zirconium barrier layer inner circumferential surface, wherein the inner liner comprises a zirconium alloy having less than about 1.2% tin by weight.

2. The method of claim 1 wherein steps (a) and (b) are conducted as a single step.

3. The method of claim 1 wherein steps (a) and (b) are conducted as separate steps.

4. The method of claim 1 wherein at least one of steps (a) and (b) is an extrusion step, and wherein at least two of the substrate, the zirconium barrier layer, and the inner liner are co-extruded.

5. The method of claim 1 wherein at least one of steps (a) and (b) is a hot isostatic pressing step, and wherein at least two of the substrate, the zirconium barrier layer, and the inner liner are bonded by the hot isostatic pressing step.

6. The method of claim 1 further comprising a plurality of tube reduction steps.

7. The method of claim 6 wherein the tube reduction steps comprise at least three coldwork steps, each of at least about 35%.

8. The method of claim 7 wherein each tube reduction step independently is conducted with either a pilger mill or an HPTR machine.

9. The method of claim 6 wherein each tube reduction step is followed by an annealing step.

10. The method of claim 9 wherein at least one of the annealing steps is a recrystallization anneal.

11. A method of making a cladding tube having an outer substrate, an intermediate zirconium barrier layer, and an inner liner, the substrate, barrier layer, and inner liner each having interior and exterior circumferential surfaces, the method comprising the following steps:

(a) bonding the zirconium barrier layer exterior circumferential surface to the substrate interior circumferential surface; and (b) bonding the inner liner outer circumferential surface to the zirconium barrier layer inner circumferential surface, wherein the inner liner comprises a zirconium alloy having less than about 1000 ppm oxygen by weight.

12. The method of claim 11 wherein steps (a) and (b) are conducted as a single step.

13. The method of claim 11 wherein steps (a) and (b) are conducted as separate steps.

14. The method of claim 11 wherein at least one of steps (a) and (b) is an extrusion step, and wherein at least two of the substrate, the zirconium barrier layer, and the inner liner are co-extruded.

15. The method of claim 11 wherein at least one of steps (a) and (b) is a hot isostatic pressing step, and wherein at least two of the substrate, the zirconium barrier layer, and the inner liner are bonded by the hot isostatic pressing step.

16. The method of claim 11 further comprising a plurality of tube reduction steps.

17. The method of claim 16 wherein the tube reduction steps comprise at least three coldwork steps, each of at least about 35%.

18. The method of claim 17 wherein each tube reduction step independently is conducted with either a pilger mill or an HPTR machine.

19. The method of claim 16 wherein each tube reduction step is followed by an annealing step.

20. The method of claim 19 wherein at least one of the annealing steps is a recrystallization anneal.

21. A method of making a cladding tube having an outer substrate, an intermediate zirconium barrier layer, and an inner liner, the substrate, barrier layer, and inner liner each having interior and exterior circumferential surfaces, the method comprising the following steps:
 (a) bonding the zirconium barrier layer exterior circumferential surface to the substrate interior circumferential surface; and
 (b) bonding the inner liner outer circumferential surface to the zirconium barrier layer inner circumferential surface, wherein the inner liner of the cladding tube has a radial thickness of less than about 20 micrometers.

22. The method of claim 21 wherein steps (a) and (b) are conducted as a single step.

23. The method of claim 21 wherein steps (a) and (b) are conducted as separate steps.

24. The method of claim 21 wherein at least one of steps (a) and (b) is an extrusion step, and wherein at least two of the substrate, the zirconium barrier layer, and the inner liner are co-extruded.

25. The method of claim 21 wherein at least one of steps (a) and (b) is a hot isostatic pressing step, and wherein at least two of the substrate, the zirconium barrier layer, and the inner liner are bonded by the hot isostatic pressing step.

26. The method of claim 21 further comprising a plurality of tube reduction steps.

27. The method of claim 26 wherein the tube reduction steps comprise at least three coldwork steps, each of at least about 35%.

28. The method of claim 27 wherein each tube reduction step is conducted with a pilger mill or an HPTR machine.

29. The method of claim 28 wherein each tube reduction step is followed by an annealing step.

30. The method of claim 29 wherein at least one of the annealing steps is a recrystallization anneal.

31. A method of making a cladding tube from a tubeshell having an outer substrate, an intermediate zirconium barrier layer, and a zirconium alloy inner liner, the substrate, zirconium barrier layer, and zirconium alloy inner liner each having interior and exterior circumferential surfaces, the method comprising the following steps:
 (a) conducting a first pass cold work step followed by an anneal;
 (b) conducting a second pass cold work step followed by an anneal;
 (c) conducting a third pass cold work step followed by an anneal; and
 (d) conducting a fourth pass cold work step followed by an anneal.

32. The method of claim 31 wherein the third and fourth cold work steps are each conducted to between about 30 and 60 percent.

33. The method of claim 31 wherein the cold work steps are each conducted with a pilger mill.

34. The method of claim 31 wherein at least one of the second, third, and fourth pass cold work steps is conducted with an HPTR machine.

35. The method of claim 31 wherein the first and second pass cold work steps are each conducted to between about 60 and 80 percent.

36. The method of claim 35 wherein the third and fourth pass cold work steps are each conducted to between about 30 and 60 percent.

37. The method of claim 36 wherein the first pass cold work step is conducted to about 69 percent, the second pass cold work step is conducted to about 74 percent, the third pass cold work step is conducted to about 45 percent, and the fourth pass cold work step is conducted to about 45 percent.

38. The method of claim 31 wherein at least one of the anneals is a recrystallization anneal.

39. The method of claim 38 wherein each anneal is a recrystallization anneal.

40. A method of making a cladding tube having an outer substrate, an intermediate zirconium barrier layer, and an inner liner, the substrate, barrier layer, and inner liner each having interior and exterior circumferential surfaces, the method comprising the following steps:
 (a) bonding the zirconium barrier layer exterior circumferential surface to the substrate interior circumferential surface; and
 (b) bonding the inner liner outer circumferential surface to the zirconium barrier layer inner circumferential surface, wherein the inner liner comprises a zirconium alloy, and wherein at least one of steps (a) and (b) is a hot isostatic pressing step.

41. The method of claim 40 wherein the step of hot isostatic pressing is conducted at a temperature of between about 400° and 850° C. and a pressure of between about 13,000 and 40,000 psi.

42. The method of claim 40 wherein the step of hot isostatic pressing is conducted at a temperature of between about 400° and 700° C. and at a pressure of between about 20,000 and 40,000 psi.

43. The method of claim 40 further comprising a step of extruding the substrate.

44. A method of claim 43 wherein the step of hot isostatic pressing is conducted before extrusion.

45. The method of claim 44 wherein both the zirconium barrier layer and the zirconium alloy inner liner are bonded by hot isostatic pressing before the extrusion step.

46. The method of claim 43 wherein the step of hot isostatic pressing is conducted after extrusion.

47. The method of claim 46 wherein both the zirconium barrier layer and the zirconium alloy inner liner are bonded to the substrate after extrusion.

48. The method of claim 46 wherein the zirconium barrier layer is bonded to the substrate during extrusion and the zirconium alloy inner liner is bonded to the inner circumferential surface of the zirconium barrier layer by hot isostatic pressing after extrusion.

49. A method of making a cladding tube having an outer substrate, an intermediate zirconium barrier layer, and an inner liner, the substrate, barrier layer, and inner liner each having interior and exterior circumferential surfaces, the method comprising the following steps:
  (a) bonding the zirconium barrier layer exterior circumferential surface to the substrate interior circumferential surface; and
  (b) bonding the inner liner outer circumferential surface to the zirconium barrier layer inner circumferential surface, wherein prior to bonding the substrate inner circumferential surface, the zirconium barrier layer interior and exterior circumferential surfaces and the inner liner exterior circumferential surface each have a surface roughness of not greater than about 64 microinches.

50. The method of claim 49 wherein the substrate interior circumferential surface, the zirconium barrier layer interior and exterior circumferential surfaces, and the inner liner exterior circumferential surfaces each have a surface roughness of not greater than about 32 microinches.

51. The method of claim 49 wherein at least one of the substrate interior circumferential surface, the zirconium barrier layer interior and exterior circumferential surfaces, and the inner liner exterior circumferential surface is subjected to chemical etching before bonding.

52. The method of claim 49 wherein at least one of the substrate interior circumferential surface, the zirconium barrier layer interior and exterior circumferential surfaces, and the inner liner exterior circumferential surface is subjected to a mechanical conditioning process selected from the group consisting of machining, grinding, buffing, and sanding.

53. The method of claim 49 wherein at least one of the substrate interior circumferential surface, the zirconium barrier layer interior and exterior circumferential surfaces, and the inner liner exterior circumferential surface is subjected to chemical-mechanical polishing.

54. The method of claim 53 wherein the chemical-mechanical polishing is conducted with an acidic slurry.

* * * * *